United States Patent
Lenaerts et al.

(10) Patent No.: US 12,065,574 B2
(45) Date of Patent: Aug. 20, 2024

(54) UV CURABLE INKJET INK SETS AND INKJET PRINTING METHODS

(71) Applicant: AGFA NV, Mortsel (BE)

(72) Inventors: Jens Lenaerts, Mortsel (BE); Eugenie Icart, Mortsel (BE); Marc Graindourze, Mortsel (BE); Rita Torfs, Mortsel (BE)

(73) Assignee: Agfa NV, Mortsel (BE)

(*) Notice: Subject to any disclaimer, the term of this patent is extended or adjusted under 35 U.S.C. 154(b) by 119 days.

(21) Appl. No.: 17/918,612

(22) PCT Filed: Mar. 29, 2021

(86) PCT No.: PCT/EP2021/058134
§ 371 (c)(1),
(2) Date: Oct. 13, 2022

(87) PCT Pub. No.: WO2021/209249
PCT Pub. Date: Oct. 21, 2021

(65) Prior Publication Data
US 2023/0147171 A1    May 11, 2023

(30) Foreign Application Priority Data

Apr. 16, 2020 (EP) .................................... 20169770

(51) Int. Cl.
*B41J 2/01* (2006.01)
*C09D 11/324* (2014.01)
*C09D 11/38* (2014.01)
*C09D 11/40* (2014.01)

(52) U.S. Cl.
CPC ............ *C09D 11/324* (2013.01); *B41J 2/01* (2013.01); *C09D 11/38* (2013.01); *C09D 11/40* (2013.01)

(58) Field of Classification Search
CPC ..... B41J 2/01; B41J 2/21; B41M 1/18; B41M 1/20; B41M 5/5218; C09D 11/324; C09D 11/38; C09D 11/40; C09D 11/101; C09D 11/322
See application file for complete search history.

(56) References Cited

U.S. PATENT DOCUMENTS

2009/0247672 A1* 10/2009 Hanawa ................. C09D 11/32
524/100
2010/0330296 A1* 12/2010 Loccufier ............. C09D 11/101
522/26

FOREIGN PATENT DOCUMENTS

| DE | 102016203528 A1 | 9/2017 | |
| EP | 1403334 A1 | 3/2004 | |
| EP | 2623567 A1 | 8/2013 | |
| EP | 2582527 A1 | 3/2014 | |
| EP | 3896132 * | 10/2021 | ................ B41J 2/01 |
| JP | 2016-172822 A | 9/2016 | |
| JP | 2019-007014 A | 1/2019 | |

OTHER PUBLICATIONS

European Patent Office, International Search Report in International Patent Application No. PCT/EP2021/058134, mailed Jun. 28, 2021, 3 pp.
European Patent Office, Written Opinion in International Patent Application No. PCT/EP2021/058134, mailed Jun. 28, 2021, 5 pp.

* cited by examiner

*Primary Examiner* — Kristal Feggins
(74) *Attorney, Agent, or Firm* — Leydig, Voit & Mayer, Ltd.

(57) ABSTRACT

A UV curable pigmented inkjet ink set comprising: one or more achromatic colour inkjet inks including a black inkjet ink containing a carbon black pigment; and five chromatic colour inkjet inks including: a first inkjet ink WR having a hue angle H* between 10° and 40° and a chroma C* between 30 and 80; a second inkjet ink WY having a hue angle H* between 65° and 85° and a chroma C* between 30 and 80; a third inkjet ink Y having a hue angle H* between 85° and 105° and a chroma C* larger than 80; a fourth inkjet ink C having a hue angle H* between 180° and 240° and a chroma C* between 30 and 80; and a fifth inkjet ink M having a hue angle H* between 300° and 360° and a chroma C* between 30 and 80; wherein the hue angle H* and the chroma C* were calculated from CIE L*a*b* coordinates determined on a polyethylene coated white paper for a 2° observer under a D50 light source; wherein the chromatic colour inkjet inks having a hue angle H* between 180° and 360° have a ratio T/P of thioxanthone compound to pigment complying with the relationship: $0.0 \leq T/P \leq 0.2$, wherein T represents the wt % of thioxanthone compound and P represents the wt % of pigment, both wt % based on the total weight of the inkjet ink.

17 Claims, No Drawings

UV CURABLE INKJET INK SETS AND INKJET PRINTING METHODS

CROSS-REFERENCE TO RELATED APPLICATIONS

This patent application is the U.S. national phase of copending International Patent Application No. PCT/EP2021/058134, filed Mar. 29, 2021, which claims the benefit of European Patent Application No. 20169770.3, filed Apr. 16, 2020.

TECHNICAL FIELD

The present invention relates to UV curable inkjet inks and inkjet printing methods for manufacturing decorative panels, especially for manufacturing furniture edge bands.

BACKGROUND ART

Industrial inkjet printing systems have been developed to replace gravure printing for manufacturing decorative panels, allowing for just-in-time manufacturing, short production runs and customized/personalized products. In order to achieve high productivity, single-pass inkjet printing systems have been developed as exemplified by EP 2582527 A (PADALUMA INK JET SOLUTIONS) and DE 102016203528 (KOENIG).

Inkjet ink sets for accurately reproducing wood colours of such decorative panels have been designed to exhibit minimal metamerism as disclosed, for example, by EP 2623567 A (AGFA). Metamerism is the phenomenon that occurs when two materials match in colour under some lighting conditions, but not under other lighting conditions. A customer expects all parts of furniture having the same colour to match whether viewed in daylight, under halogen lighting or under other light sources.

Another form of colour inconstancy is observed after the curing of UV curable inkjet inks. The colour of the cured ink can change drastically over a period of time, typically over 24 hours, due to further degradation of coloured photoinitiator residues.

For just-in-time manufacturing of decorative furniture panels, these colour inconstancies cause productivity problems as a 24-hour delay is undesirable for perfectly matching colours in e.g. a furniture table including an on a polymeric substrate inkjet printed edge band and an on paper gravure printed top panel.

Due to changes in fashion, customers now also desire furniture having special designs, such as marble or vibrant colour designs, instead of the traditional wood images. These special colour designs can either often not be printed with an inkjet ink set optimized for printing metamerism-free wood designs or are otherwise printed with decreased image quality. This leads to a loss in productivity as, for example, different types of ink sets have to be installed on different inkjet printers or a very complex inkjet printer is to be used.

Hence, there is still a need for further improved inkjet ink sets used in manufacturing decorative panels by inkjet that reduces the manufacturing time spent to handle colour inconstancies and that is able to print a wide range of designs from wood designs to special colour designs, while not decreasing productivity or image quality.

SUMMARY OF INVENTION

In order to overcome the problems described above, preferred embodiments of the present invention have been realised with a UV curable pigmented inkjet ink set as defined here below.

It was found that the colour inconstancy between curing and 24 hours after curing was especially observed for chromatic inkjet inks having a hue angle H* between 180° and 360°, and that this colour inconstancy could be minimized by controlling the weight ratio of thioxanthone compound to pigment within a certain range in the inkjet inks of a specific UV curable inkjet ink set.

It was also found that a wide range of vibrant colour designs as well as traditional wood designs could be inkjet printed by a combination of a UV curable black inkjet ink and five specific UV curable chromatic colour inkjet inks, without any loss in productivity or image quality.

It is an object of the invention to provide a specific UV curable inkjet ink set for manufacturing decorative panels, especially edge band panels.

Another object of the invention is to provide an inkjet printing method using inkjet inks of the specific UV curable inkjet ink set.

Still a further object of the invention is to provide a method of manufacturing decorative panels employing the inkjet printing method using such a combination of print heads and aqueous inkjet ink set on décor paper.

Further advantages and embodiments of the present invention will become apparent from the following description.

DESCRIPTION OF EMBODIMENTS

Definitions

The term "monofunctional" as used in monofunctional polymerizable compounds means compounds containing a single polymerizable group.

The term "polyfunctional" as used in polyfunctional polymerizable compounds means compounds containing two, three or more polymerizable groups.

The term "oligomer" means a polymerizable compound polymerized from 2 to 50 monomers.

UV Curable Inkjet Ink Sets

A UV curable pigmented inkjet ink set according to a preferred embodiment of the invention comprises: one or more achromatic colour inkjet inks including a black inkjet ink K containing a carbon black pigment; and five chromatic colour inkjet inks including: a first inkjet ink WR having a hue angle H* between 10° and 40° and a chroma C* between 30 and 80; a second inkjet ink WY having a hue angle H* between 65° and 85° and a chroma C* between 30 and 80; a third inkjet ink Y having a hue angle H* between 85° and 105° and a chroma C* larger than 80; a fourth inkjet ink C having a hue angle H* between 180° and 240° and a chroma C* between 30 and 80; and a fifth inkjet ink M having a hue angle H* between 300° and 360° and a chroma C* between 30 and 80; wherein the hue angle H* and the chroma C* were calculated from CIE L* a* b* coordinates determined on a polyethylene coated white paper for a 2° observer under a D50 light source; wherein the chromatic colour inkjet inks having a hue angle H* between 180° and 360° have a ratio T/P of thioxanthone compound to pigment complying with the relationship: $0.0 \leq T/P \leq 0.2$ wherein T represents the wt % of thioxanthone compound and P represents the wt % of pigment, both wt % based on the total weight of the inkjet ink.

The five chromatic colour inkjet inks have specific hue angles H* and chromas C* in order to simultaneously maximize image quality and productivity. In standard wide format UV inkjet printing a CMYK inkjet ink set is used. However, if images containing light coloured areas are to printed, the image quality deteriorates as it exhibits high graininess. For this reason, the CMYK inkjet ink set is extended with light cyan (Lc) and light magenta (Lm) inkjet inks. The latter inks allow to deposit more ink dots for achieving the same colour density, resulting in an improved graininess. However, even with such a CMYKLcLm inkjet ink set it is not possible to print wood designs without metamerism. This would require to include additional inkjet inks, which increases the cost and complexity of an inkjet printer, especially for single pass inkjet printing due to the high cost of colour print bars. By using a black inkjet ink and the specific five chromatic colour inkjet inks having specific hue angles C*, it is possible to print images of good image quality having low graininess for both vibrant colour designs and wood designs.

In a preferred embodiment of the UV curable inkjet ink set, the pigment concentration in inkjet inks WR and WY is each less than 1.5 wt % based on the total weight of the inkjet ink and the pigment concentration in inkjet inks Y, C and M is each more than 1.5 wt % based on the total weight of the inkjet ink. By controlling the pigment concentration in this way the image quality is optimized for both inkjet printing vibrant colour designs and wood designs. For obtaining excellent graininess, the pigment concentration in the ink jet inks C and M, is preferably smaller than 3 wt % based on the total weight of the inkjet ink. The pigment concentration of the inkjet ink Y is preferably larger than 3 wt % based on the total weight of the inkjet ink.

In a preferred embodiment, the pigment concentration of the black inkjet ink K is smaller than the pigment concentration in the ink jet inks C and/or M. This allows for under colour removal while improving graininess and reducing ink consumption.

In a preferred embodiment of the UV curable inkjet ink set, the inkjet ink WR includes a mixture of a red pigment and an orange pigment and the inkjet ink WY includes a mixture of a yellow pigment and an orange pigment. The latter allows to obtain minimal metamerism in wood designs.

In a preferred embodiment of the UV curable inkjet ink set, the inkjet ink C contains a beta-copper phthalocyanine pigment.

In a preferred embodiment of the UV curable inkjet ink set, the inkjet ink M contains a pigment selected from the group consisting of quinacridone, diketopyrrolopyrrole and mixed crystals thereof.

In a preferred embodiment of the UV curable inkjet ink set, the inkjet ink Y contains a pigment selected from C.I. Pigment Yellow 74 C.I. Pigment Yellow 83, C.I. Pigment Yellow 97, C.I. Pigment Yellow 110, C.I. Pigment Yellow 120, C.I. Pigment Yellow 138, C.I. Pigment Yellow 150, C.I. Pigment Yellow 151, C.I. Pigment Yellow 154, C.I. Pigment Yellow 155, C.I. Pigment Yellow 175, C.I. Pigment Yellow 180, C.I. Pigment Yellow 181, C.I. Pigment Yellow 194, C.I. Pigment Yellow 213, C.I. Pigment Yellow 214 and mixed crystals thereof, preferably C.I. Pigment Yellow 150 or a mixed crystal thereof.

In a preferred embodiment of the UV curable inkjet ink set, the black inkjet ink K further contains one or more colour pigments having an absorption maximum between 500 and 700 nm. In addition to the black inkjet K, the UV curable inkjet ink set may include a further achromatic colour inkjet ink, such as a white inkjet ink and/or a colourless inkjet ink.

The surface tension of the UV curable inkjet inks is preferably smaller than 25 mN/m when measured at 25° C. Such a surface tension allows for good ink spreading on substrates like PVC, PP and ABS often used in decorative panels like edge band. Good ink spreading results in good image quality.

The viscosity of the inkjet inks is preferably smaller than 20 mPa·s at 45° C. and at a shear rate of 1,000 s$^{-1}$, more preferably between 5 and 15 mPa·s at 45° C. and at a shear rate of 1,000 s$^{-1}$.

UV Curable Inkjet Inks

The UV curable inkjet ink set contains two types of UV curable inkjet inks, i.e. achromatic and chromatic colour inkjet inks.

An achromatic colour inkjet ink is an inkjet ink that lacks a hue or saturation, such as a white, grey or black inkjet ink. The chroma C* of such an achromatic colour inkjet ink is close to 0.

A chromatic colour inkjet ink is inkjet ink having a noticeable hue or saturation, usually exhibiting a chroma C* of more than 10.

Achromatic Colour Inkjet Inks

Black Inkjet Inks

The UV curable Inkjet Ink contains at least a Black inkjet ink as achromatic colour inkjet ink. The colorant in the black inkjet ink includes at least a carbon black as pigment.

Suitable black pigments include carbon blacks such as Pigment Black 7 (e.g. Carbon Black MA8® from MITSUBISHI CHEMICAL), Regal® 400R, Mogul® L, Elftex® 320 from CABOT Co., or Carbon Black FW18, Special Black 250, Special Black 350, Special Black 550, Printex® 25, Printex® 35, Printex® 55, Printex® 90, Printex® 150T from DEGUSSA. In a preferred embodiment, the carbon black pigment used is a pigment having less than 0.15% of toluene-extractable fraction using the method as described in section III, paragraph 5 of the Resolution AP(89) 1 dated 13 Sep. 1989 published by the Council of Europe.

The UV curable black inkjet ink preferably has a chroma C* not larger than 4, particularly preferably less than 2. A reduced ink consumption was observed when a UV curable ink-jet black ink having a chroma C* not larger than 4.0 was used in the UV curable inkjet ink set.

Such a chroma C* of less than 4 can be easily achieved by including, in addition to the carbon black pigment, one or more colour pigments having an absorption maximum between 500 and 700 nm, such as a cyan or magenta colour pigment. In a particularly preferred embodiment, the UV curable black inkjet ink contains the same pigment as used in the inkjet ink C and/or the inkjet ink M.

For further improving graininess, the UV curable inkjet ink set, may include a second black inkjet ink having a smaller pigment concentration, preferably a pigment concentration in the range of 0.1 to 1.0 wt % based on the total weight of the UV curable black inkjet ink. Such a second black inkjet ink is usually referred to as a grey inkjet ink or a light black inkjet ink. Such a light black inkjet ink preferably includes one or more colour pigments having an absorption maximum between 500 and 700 nm.

The numeric average pigment particle size is preferably between 70 and 200 nm, more preferably smaller than 150 nm. An average particle size smaller than 70 nm is less desirable for decreased light-fastness, while an average particle size larger than 200 nm reduces the colour gamut.

White Inkjet Inks

Some substrates used for a decorative panel have been coloured in the bulk, which makes it not possible to achieve certain desired colour designs by inkjet printing with the above UV curable inkjet ink set. This can be resolved by inkjet printing a white ink layer between the substrate and the chromatic inkjet inks.

A UV curable white inkjet ink preferably has a composition according to Table 1. The type and concentration of the components may be those as described here below.

TABLE 1

| Component | wt % |
|---|---|
| White Pigment | 10-25 |
| Dispersant | 0.5-10 |
| Polymerizable compounds | 45-82 |
| Photoinitiator | 5-20 |
| Co-initiator | 0-15 |
| Polymerization inhibitor | 0-3 |
| Other additives | 0-10 |
| Surfactant | 0-3 |

In a preferred embodiment of the white inkjet ink, the photoinitiators consist for 75 wt %, preferably 90 wt % and most preferably for 100 wt % of acylphosphine oxide photoinitiators, with the wt % based on the total weight of photoinitiators in the white inkjet ink.

The UV curable white inkjet ink preferably includes an inorganic pigment as white pigment. Preferably a pigment with a refractive index greater than 1.60, more preferably greater than 2.00 and most preferably greater than 2.60 is used. A titanium dioxide pigment, such as rutile, is particularly preferred for the white pigment. Having the above refractive index, the dry thickness of the white ink layer can be minimized which is beneficial for productivity.

Titanium oxide occurs in the crystalline forms of anatase type, rutile type and brookite type. The anatase type has a relatively low density and is easily ground into fine particles, while the rutile type has a relatively high refractive index, exhibiting a high covering power. Either one of these is usable in this invention. It is preferred to make the most possible use of characteristics and to make selections according to the use thereof. The use of the anatase type having a low density and a small particle size can achieve superior dispersion stability, ink storage stability and ejectability. At least two different crystalline forms may be used in combination. The combined use of the anatase type and the rutile type which exhibits a high hiding power can reduce the total amount of titanium oxide, leading to improved storage stability and ejection performance of ink.

For surface treatment of the titanium oxide, an aqueous treatment or a gas phase treatment is applied, and an alumina-silica treating agent is usually employed. Untreated-, alumina treated- or alumina-silica treated-titanium oxide are employable. Alone or in addition to the previous surface treatments, an organic surface treatment may be used.

The numeric average particle diameter of the titanium oxide or other white pigments is preferably from 180 to 400 nm, more preferably from 200 to 330 nm, and most preferably from 220 to 300 nm. Sufficient hiding power cannot be obtained when the average diameter is less than 180 nm, and the storage ability and the jet-out reliability of the ink tend to be degraded when the average diameter exceeds 400 nm.

The determination of the numeric average particle diameter is best performed by photon correlation spectroscopy at a wavelength of 633 nm with a 4 mW HeNe laser on a diluted sample of the pigmented inkjet ink.

A suitable particle size analyzer used was a Malvern™ nano-S available from Goffin-Meyvis. A sample is prepared by addition of one drop of ink to a cuvet containing 1.5 mL ethyl acetate and mixed until a homogenous sample was obtained. The measured particle size is the average value of 3 consecutive measurements consisting of 6 runs of 20 seconds.

Colourless Inkjet Inks

In the present invention, the achromatic inkjet ink may also be a colourless inkjet ink. Such an inkjet ink does not contain any colorant and lacks thus also a hue or saturation. It can be used for example as digital varnish and/or as a primer. A digital varnish protects the colour pattern printed with the chromatic inkjet inks. The primer may improve the adhesion to a substrate A colourless inkjet ink preferably has a composition according to Table 2. The type and concentration of the components used in the colourless inkjet ink may be those as described here below.

TABLE 2

| Component | wt % |
|---|---|
| Polymerizable compounds | 49-95 |
| Photoinitiator | 5-20 |
| Co-initiator | 0-15 |
| Polymerization inhibitor | 0-3 |
| Other additives | 0-10 |
| Surfactant | 0-3 |

In a preferred embodiment of the colourless inkjet ink, the photoinitiators consist for 75 wt %, preferably 90 wt % and most preferably for 100 wt % of acylphosphine oxide photoinitiators, with the wt % based on the total weight of photoinitiators in the colourless inkjet ink.

Chromatic Colour Inkjet Inks

The colorant for the chromatic colour inkjet inks may be selected from dyes, pigments or a combination thereof as long as they accomplish the hue angles H* and chromas C* defined above. Organic and/or inorganic pigments may be used. The colorant is preferably a pigment or a polymeric dye, most preferably a pigment. The UV curable inkjet inks preferably contain organic colour pigments as they allow for obtaining a high colour gamut.

The colour pigments may be cyan, magenta, yellow, red, orange, violet, blue, green, brown, mixtures thereof, and the like. This colour pigment may be chosen from those disclosed by HERBST, Willy, et al. Industrial Organic Pigments, Production, Properties, Applications. 3rd edition. Wiley-VCH, 2004. ISBN 3527305769.

Suitable colour pigments also include mixed crystals of the above particular preferred pigments. Mixed crystals are also referred to as solid solutions. For example, under certain conditions different quinacridones mix with each other to form solid solutions, which are quite different from both physical mixtures of the compounds and from the compounds themselves. In a solid solution, the molecules of the components enter into the same crystal lattice, usually, but not always, that of one of the components. The x-ray diffraction pattern of the resulting crystalline solid is characteristic of that solid and can be clearly differentiated from the pattern of a physical mixture of the same components in the same proportion. In such physical mixtures, the x-ray pattern of each of the components can be distinguished, and the disappearance of many of these lines is one of the criteria of the formation of solid solutions. A commercially available example is Cinquasia Magenta RT-355-D from BASF AG.

The UV curable inkjet ink WR preferably includes a mixture of a red pigment and an orange pigment.

The UV curable inkjet ink WY preferably includes a mixture of a yellow pigment and an orange pigment Particular preferred orange pigments are C.I. Pigment Orange 5, 13, 16, 34, 40, 43, 59, 66, 67, 69, 71 and 73.

Particularly preferred red pigments are selected from the group consisting of C.I. Pigment Red 57/1, C.I. Pigment Red 122, C.I. Pigment Red 170, C.I. Pigment Red 175, C.I. Pigment Red 176, C.I. Pigment Red 187, C.I. Pigment Red 188, C.I. Pigment Red 207, C.I. Pigment Red 242, C.I. Pigment Red 254, C.I. Pigment Red 272 and mixed crystals thereof Particularly preferred yellow pigments selected from C.I. Pigment Yellow 74 C.I. Pigment Yellow 83, C.I. Pigment Yellow 97, C.I. Pigment Yellow 110, C.I. Pigment Yellow 120, C.I. Pigment Yellow 138, C.I. Pigment Yellow 139, C.I. Pigment Yellow 150, C.I. Pigment Yellow 151, C.I. Pigment Yellow 154, C.I. Pigment Yellow 155, C.I. Pigment Yellow 175, C.I. Pigment Yellow 180, C.I. Pigment Yellow 181, C.I. Pigment Yellow 194, C.I. Pigment Yellow 213, C.I. Pigment Yellow 214 and mixed crystals thereof;

In a preferred embodiment, the inkjet ink WR includes a mixture of C.I. Pigment Orange 71 and a pigment selected from the group consisting of C.I. Pigment Violet 19, C.I. Pigment Red 122, C.I. Pigment Red 254, C.I. Pigment Red 202 and C.I. Pigment Red 57:1.

In a more preferred embodiment, the inkjet ink WY includes a mixture of C.I. Pigment Red 254, C.I. Pigment Red 122 and C.I. Pigment Orange 71.

The UV curable inkjet ink WY preferably includes a mixture of a yellow pigment and an orange pigment.

In a preferred embodiment, the inkjet ink WY includes a mixture of a yellow pigment and C.I. Pigment Orange 71, most preferably a mixture of C.I. Pigment Yellow 139 and C.I. Pigment Orange 71.

The UV curable inkjet ink C preferably contains a beta-copper phthalocyanine pigment, preferably a C.I. Pigment Blue 15:4 pigment.

The UV curable inkjet ink M preferably contains a pigment selected from the group consisting of quinacridone, diketopyrrolopyrrole and mixed crystals thereof.

Particularly preferred pigments for the UV curable inkjet ink M are selected from the group consisting of C.I. Pigment Violet 19, C.I. Pigment Red 122, 176, 202 and 254, as well as mixed crystals containing one of the foregoing. The latter provide for good colour reproduction and light stability.

The UV curable inkjet ink Y preferably contains a pigment selected from C.I. Pigment Yellow 74 C.I. Pigment Yellow 83, C.I. Pigment Yellow 97, C.I. Pigment Yellow 110, C.I. Pigment Yellow 120, C.I. Pigment Yellow 138, C.I. Pigment Yellow 150, C.I. Pigment Yellow 151, C.I. Pigment Yellow 154, C.I. Pigment Yellow 155, C.I. Pigment Yellow 175, C.I. Pigment Yellow 180, C.I. Pigment Yellow 181, C.I. Pigment Yellow 194, C.I. Pigment Yellow 213, C.I. Pigment Yellow 214 and mixed crystals thereof, preferably C.I. Pigment Yellow 150 ora mixed crystal thereof.

Pigment particles in chromatic colour inkjet inks should be sufficiently small to permit free flow of the ink through the inkjet-printing device, especially at the ejecting nozzles. It is also desirable to use small particles for maximum colour strength and to slow down sedimentation.

The numeric average pigment particle size is preferably between 50 nm and 220 nm, more preferably between 70 nm and 200 nm and particularly preferably between 100 and 170 nm. An average particle size smaller than 50 nm is less desirable for decreased light-fastness, while an average particle size larger than 220 nm reduces the colour gamut.

The numeric average pigment particle size of pigment particles is best determined based upon the principle of dynamic light scattering. A suitable particle size analyzer used was a Malvern™ nano-S available from Goffin-Meyvis. A sample is prepared by addition of one drop of ink to a cuvet containing 1.5 mL ethyl acetate and mixed until a homogenous sample was obtained. The measured particle size is the average value of 3 consecutive measurements consisting of 6 runs of 20 seconds.

Inkjet Printing Methods

Another aspect of the invention is an inkjet printing method preferably including the steps of: a) jetting inkjet inks from a UV curable inkjet ink set as described above on a substrate; and b) UV curing the inkjet inks on the substrate using UV LEDs having an emission wavelength between 360 nm and 405 nm. The substrate is preferably selected from the group consisting of polyvinylchloride (PVC), acrylonitrile butadiene styrene (ABS) and polypropylene (PP).

In a preferred embodiment, the substrate is pre-treated. In order to avoid charging of the substrate, the pre-treatment is preferably an anti-static pre-treatment. In order improve adhesion and/or dot spreading of the ink, the pre-treatment is preferably a corona or plasma pre-treatment to improve adhesion and dot spreading, or involves the application of a primer, which may be coated, but is preferably a digital primer.

Dispersants

Pigments are usually stabilized in the dispersion medium of polymerizable compounds by a dispersing agent, such as a polymeric dispersant or surfactant. In a preferred embodiment, the pigment is stabilized by a polymeric dispersant.

The pigment is preferably used in a concentrated pigment dispersion for preparing the inkjet inks in an amount of 10 to 40 wt %, more preferably of 12 to 20 wt % based on the total weight of the pigment dispersion. The concentrated pigment dispersion is then diluted into a UV curable inkjet ink.

Typical polymeric dispersants are copolymers of two monomers but may contain three, four, five or even more monomers. The properties of polymeric dispersants depend on both the nature of the monomers and their distribution in the polymer. Copolymeric dispersants preferably have the following polymer compositions:
- statistically polymerized monomers (e.g. monomers A and B polymerized into ABBAABAB);
- alternating polymerized monomers (e.g. monomers A and B polymerized into ABABABAB);
- gradient (tapered) polymerized monomers (e.g. monomers A and B polymerized into AAABAABBABBB);
- block copolymers (e.g. monomers A and B polymerized into AAAAABBBBBB) wherein the block length of each of the blocks (2, 3, 4, 5 or even more) is important for the dispersion capability of the polymeric dispersant;
- graft copolymers (graft copolymers consist of a polymeric backbone with polymeric side chains attached to the backbone); and
- mixed forms of these polymers, e.g. blocky gradient copolymers.

The polymeric dispersant has preferably a number average molecular weight Mn between 500 and 30000, more preferably between 1500 and 10000. Larger molecular weight dispersants tend to increase the viscosity of the ink too much without adequately providing good dispersion stability.

The polymeric dispersant has preferably a weight average molecular weight Mw smaller than 100,000, more preferably smaller than 50,000 and most preferably smaller than 30,000.

The polymeric dispersant has preferably a polydispersity PD smaller than 2, more preferably smaller than 1.75 and most preferably smaller than 1.5.

Commercial examples of polymeric dispersants are the following:
- DISPERBYK™ dispersants available from BYK CHEMIE GMBH;
- SOLSPERSE™ dispersants available from LUBRIZOL;
- TEGO™ DISPERS™ dispersants from EVONIK;
- EDAPLAN™ dispersants from MUNZING CHEMIE;
- ETHACRYL™ dispersants from LYONDELL;
- GANEX™ dispersants from ISP;
- DISPEX™ and EFKA™ dispersants from BASF;
- DISPONER™ dispersants from DEUCHEM.

Particularly preferred polymeric dispersants include Solsperse™ dispersants from LUBRIZOL, Efka™ dispersants from BASF and Disperbyk™ dispersants from BYK CHEMIE GMBH. Particularly preferred Solsperse™ dispersants are Solsperse™ 32000, 35000 and 39000 dispersants from LUBRIZOL.

The polymeric dispersant is preferably used in an amount of 2 to 300 wt %, more preferably 50 to 100 wt % based on the weight of the pigment. Such an amount of 50 to 100 wt % or less provides for a good dispersion stability in combination with minimal effect on the ink viscosity.

Dispersion Aids

A dispersion aid usually consists of an anionic part and a cationic part. The anionic part of the dispersion aid exhibiting a certain molecular similarity with the colour pigment and the cationic part of the dispersion aid consists of one or more protons and/or cations to compensate the charge of the anionic part of the dispersion aid.

The dispersion aid is preferably added in a smaller amount than the polymeric dispersant(s). The ratio of polymeric dispersant/dispersion aid depends upon the pigment and should be determined experimentally. Typically, the ratio wt % polymeric dispersant/wt % dispersion aid is selected between 2:1 to 100:1, preferably between 2:1 and 20:1.

Suitable dispersion aids that are commercially available include Solsperse™ 5000 and Solsperse™ 22000 from LUBRIZOL.

Particular preferred pigments for the magenta ink used are a diketopyrrolopyrrole pigment or a quinacridone pigment. Suitable dispersion aids include those disclosed in EP 1790698 A (AGFA GRAPHICS), EP 1790696 A (AGFA GRAPHICS), WO 2007/060255 (AGFA GRAPHICS) and EP 1790695 A (AGFA GRAPHICS).

In dispersing C.I. Pigment Blue 15:3, the use of a sulfonated Cu-phthalocyanine dispersion aid, e.g. Solsperse™ 5000 from LUBRIZOL is preferred. Suitable dispersion aids for yellow inkjet inks include those disclosed in EP 1790697 A (AGFA GRAPHICS).

Photoinitiators

The UV curable inkjet inks contain one or more photoinitiators, preferably one or more free radical photoinitiators. A free radical photoinitiator is a chemical compound that initiates polymerization of monomers and oligomers when exposed to actinic radiation by the formation of a free radical.

Two types of radical photoinitiators can be distinguished. A Norrish Type I initiator is an initiator which cleaves after excitation, yielding the initiating radical immediately. A Norrish type II-initiator is a photoinitiator which is activated by actinic radiation and forms free radicals by hydrogen abstraction from a second compound that becomes the actual initiating free radical. This second compound is called a polymerization synergist or co-initiator. Both type I and type II photoinitiators can be used in the present invention, alone or in combination.

Suitable photo-initiators are disclosed in CRIVELLO, J. V., et al. VOLUME III: Photoinitiators for Free Radical Cationic. 2nd edition. Edited by BRADLEY, G. London, UK: John Wiley and Sons Ltd, 1998. p. 287-294.

Suitable examples of photoinitiators include, but are not limited to, the following compounds or combinations thereof: benzophenone and substituted benzophenones, 1-hydroxycyclohexyl phenyl ketone, thioxanthones such as isopropylthioxanthone, 2-hydroxy-2-methyl-1-phenylpropan-1-one, 2-benzyl-2-dimethylamino-(4-morpholinophenyl) butan-1-one, benzil dimethylketal, bis (2,6-dimethylbenzoyl)-2,4,4-trimethylpentylphosphine oxide, 2,4,6 trimethylbenzoyldiphenylphosphine oxide, 2-methyl-1-[4-(methylthio) phenyl]-2-morpholinopropan-1-one, 2,2-dimethoxy-1,2-diphenylethan-1-one or 5,7-diiodo-3-butoxy-6-fluorone.

Suitable commercial photo-initiators include Irgacure™ 184, Irgacure™ 500, Irgacure™ 907, Irgacure™ 369, Irgacure™ 1700, Irgacure™ 651, Irgacure™ 819, Irgacure™ 1000, Irgacure™ 1300, Irgacure™ 1870, Darocur™ 1173, Darocur™ 2959, Darocur™ 4265 and Darocur™ ITX, Lucerin™ TPO, all available from BASF, Esacure™ KT046, Esacure™ KIP150, Esacure™ KT37 and Esacure™ EDB available from LAMBERTI, H-Nu™ 470 and H-Nu™ 470X available from SPECTRA GROUP Ltd.

In a preferred embodiment of the UV curable inkjet ink set, the one or more photoinitiators of the UV curable inkjet inks include one ore more acyl phosphine oxide photoinitiators. Such an inkjet ink can be UV cured by using UV LEDs alone, wherein the UV LEDs have an emission wavelength above 360 nm.

The UV curable inkjet inks contain an acylphosphineoxide photoinitiator in an amount between 6 and 15 wt %, preferably between 7 and 13 wt % based on the total weight of the inkjet ink.

Preferred acylphosphine oxide photoinitiators include ethyl phenyl(2,4,6-trimethylbenzoyl) phosphinate available as Omnirad™ TPO-L from IGM Resins BV; 2,4,6-trimethylbenzoyl-diphenyl-phosphine oxide available as a Darocur™ TPO (manufactured by BASF); and bis(2,4,6-trimethylbenzoyl)-phenyl phosphine oxide available as Irgacure™ 819 (manufactured by BASF). Particularly preferred is that the acylphosphine oxide photoinitiators include an ethyl phenyl(2,4,6-trimethylbenzoyl) phosphinate.

The curing speed with UV LEDs of the chromatic colour inkjet inks can be further improved by including a thioxanthone compound.

In a preferred UV curable inkjet ink set, the chromatic colour inkjet inks having hue angles outside the range of 85° to 105° contain 0 to 2 wt %, preferably 0 to 1 wt %, more preferably 0 wt % of a thioxanthone compound based on the total weight of the inkjet ink.

The photoinitiator may be also be a polymeric or polymerizable photoinitiator. The polymerizable photoinitiator including one or more polymerizable groups that are preferably acrylate groups.

A preferred amount of photoinitiator is 5 to 30 wt %, more preferably 6 to 20 wt % based on the total weight of the UV curable inkjet ink.

Co-Initiators

In order to increase the photosensitivity further, the UV curable colourless inkjet ink may additionally contain co-initiators.

Suitable examples of co-initiators can be categorized in three groups:

(1) tertiary aliphatic amines such as methyldiethanolamine, dimethylethanolamine, triethanolamine, triethylamine and N-methylmorpholine;

(2) aromatic amines such as amylparadimethylaminobenzoate, 2-n-butoxyethyl-4-(dimethylamino) benzoate, 2-(dimethylamino)ethylbenzoate, ethyl-4-(dimethylamino)benzoate, and 2-ethylhexyl-4-(dimethylamino)benzoate; and (3) (meth)acrylated amines such as dialkylamino alkyl (meth)acrylates (e.g., diethylaminoethylacrylate) or N-morpholinoalkyl-(meth)acrylates (e.g., N-morpholinoethylacrylate).

The preferred co-initiators are aminobenzoates.

The co-initiator may be a polymeric or polymerizable co-initiator, preferably a polymerizable co-initiator. The polymerizable co-initiator includes one or more polymerizable groups, which are preferably acrylate groups.

The UV curable inkjet ink preferably includes the co-initiator in an amount of 1 to 30 wt %, more preferably in an amount of 2 to 20 wt % of the total weight of the UV curable inkjet ink.

Polymerizable Compounds

Polymerizable compounds are polymerized into a polymer upon UV curing. Any polymerizable compound commonly known in the art may be employed and includes any monomer, oligomer and/or prepolymer as long it allows obtaining a viscosity suitable for inkjet printing. A combination of monomers, oligomers and/or prepolymers may also be used and they may possess different degrees of functionality. A mixture including combinations of mono-, di-, tri- and higher functionality monomers, oligomers and/or prepolymers may be used. The viscosity of the inkjet ink can be adjusted by varying the ratio between the monomers and oligomers.

The polymerizable compounds may be any monomer and/or oligomer found in the Polymer Handbook Vol 1+2, 4th edition, edited by J. BRANDRUP et al., Wiley-Interscience, 1999.

In a preferred embodiment, the monofunctional polymerizable compounds are selected from acrylic acid, methacrylic acid, maleic acid (or there salts), maleic anhydride, alkyl(meth)acrylates (linear, branched and cycloalkyl) such as methyl(meth)acrylate, n-butyl(meth)acrylate, tert-butyl (meth)acrylate, cyclohexyl(meth)acrylate, and 2-ethylhexyl (meth)acrylate; aryl(meth)acrylates such as benzyl(meth) acrylate, and phenyl(meth)acrylate; hydroxyalkyl(meth) acrylates such as hydroxyethyl(meth)acrylate, and hydroxypropyl(meth)acrylate; (meth)acrylates with other types of functionalities (e.g. oxiranes, amino, fluoro, polyethylene oxide, phosphate substituted) such as glycidyl (meth)acrylate, dimethylaminoethyl(meth)acrylate, trifluoroethyl acrylate, methoxypolyethyleneglycol (meth)acrylate, and tripropyleneglycol (meth)acrylate phosphate; allyl derivatives such as allyl glycidyl ether; styrenics such as styrene, 4-methylstyrene, 4-hydroxystyrene, 4-acetostyrene, and styrene sulfonic acid; (meth)acrylonitrile; (meth)acrylamides (including N-mono and N,N-disubstituted) such as N-benzyl (meth)acrylamide; maleimides such as N-phenyl maleimide; vinyl derivatives such as vinylcaprolactam, vinylpyrrolidone, vinylimidazole, vinylnapthalene, and vinyl halides; vinylethers such as vinylmethyl ether; vinylesters of carboxylic acids such as vinylacetate, vinylbutyrate, and vinyl benzoate.

For achieving high curing speeds with UV LEDs, the polymerizable compounds include one or more acrylate groups In a more preferred embodiment, the monofunctional polymerizable compounds are selected from monoacrylates and vinyllactams, such as N-vinylcaprolactam Particularly preferred monofunctional polymerizable compounds are selected from the group consisting of isoamyl acrylate, stearyl acrylate, lauryl acrylate, octyl acrylate, decyl acrylate, isoamylstyl acrylate, isostearyl acrylate, 2-ethylhexyl-diglycol acrylate, 2-hydroxybutyl acrylate, 2-acryloyloxyethylhexahydrophthalic acid, butoxyethyl acrylate, ethoxydiethylene glycol acrylate, methoxydiethylene glycol acrylate, methoxypolyethylene glycol acrylate, methoxypropylene glycol acrylate, phenoxyethyl acrylate, tetrahydrofurfuryl acrylate, isobornyl acrylate, 2-hydroxyethyl acrylate, 2-hydroxypropyl acrylate, 2-hydroxy-3-phenoxypropyl acrylate, vinyl ether acrylate, 2-acryloyloxyethylsuccinic acid, 2-acryloyxyethylphthalic acid, 2-acryloxyethyl-2-hydroxyethyl-phthalic acid, lactone modified flexible acrylate, t-butylcyclohexyl acrylate, caprolactone acrylate, cyclic trimethylolpropane formal acrylate, cyclic trimethylolpropane formal acrylate, ethoxylated nonyl phenol acrylate, isodecyl acrylate, isooctyl acrylate, octyldecyl acrylate, alkoxylated phenol acrylate, tridecyl acrylate and acryloylmorpholine.

Particularly preferred polyfunctional polymerizable compounds are selected from the group consisting of triethylene glycol diacrylate, tetraethylene glycol diacrylate, polyethylene glycol diacrylate, dipropylene glycol diacrylate, tripropylene glycol diacrylate, polypropylene glycol diacrylate, 1,4-butanediol diacrylate, 1,6-hexanediol diacrylate, 1,9-nonanediol diacrylate, neopentyl glycol diacrylate, dimethyloltricyclodecane diacrylate, bisphenol A EO (ethylene oxide) adduct diacrylate, bisphenol A PO (propylene oxide) adduct diacrylate, hydroxypivalate neopentyl glycol diacrylate, propoxylated neopentyl glycol diacrylate, alkoxylated dimethyloltricyclodecane diacrylate and polytetramethylene glycol diacrylate, trimethylolpropane triacrylate, EO modified trimethylolpropane triacrylate, tri (propylene glycol) triacrylate, caprolactone modified trimethylolpropane triacrylate, pentaerythritol triacrylate, pentaerithritol tetraacrylate, pentaerythritolethoxy tetraacrylate, dipentaerythritol hexaacrylate, ditrimethylolpropane tetraacrylate, glycerinpropoxy triacrylate, alkoxylated cyclohexanone dimethanol diacrylate, caprolactam modified dipentaerythritol hexaacrylate, alkoxylated cyclohexanone dimethanol diacrylate, alkoxylated hexanediol diacrylate, dioxane glycol diacrylate, dioxane glycol diacrylate, cyclohexanone dimethanol diacrylate, diethylene glycol diacrylate, neopentyl glycol diacrylate, vinylether acrylates, propoxylated glycerine triacrylate and propoxylated trimethylolpropane triacrylate, ditrimethylolpropane tetraacrylate, dipentaerythritol pentaacrylate, ethoxylated pentaerythritol tetraacrylate, methoxylated glycol acrylates and acrylate esters.

Preferred vinylether acrylates are those disclosed in U.S. Pat. No. 6,310,115 (AGFA). A particularly preferred compound is 2-(2-vinyloxyethoxy)ethyl acrylate. Other suitable vinylether acrylates are those disclosed in columns 3 and 4 of U.S. 67/679,890 B (NIPPON SHOKUBAI).

In a preferred embodiment of the UV curable inkjet ink set, the UV curable inkjet inks preferably contain a polyfunctional acrylate monomer or oligomer in an amount of more than 50 wt %, preferably more than 60 wt % based on the total weight of the inkjet ink. The higher the content of polyfunctional acrylate monomers and oligomers, the better the scratch resistance of the inkjet printed colour pattern. Scratch resistance is an important aspect for decorative panels, especially for edge bands.

Polymerization Inhibitors

The UV curable inkjet ink may contain a polymerization inhibitor. Suitable polymerization inhibitors include phenol type antioxidants, hindered amine light stabilizers, phosphor type antioxidants, hydroquinone monomethyl ether commonly used in (meth)acrylate monomers, and hydroquinone, t-butylcatechol, pyrogallol may also be used.

Suitable commercial inhibitors are, for example, Sumilizer™ GA-80, Sumilizer™ GM and Sumilizer™ GS produced by Sumitomo Chemical Co. Ltd.; Genorad™ 16, Genorad™ 18 and Genorad™ 20 from Rahn AG; Irgastab™ UV10 and Irgastab™ UV22, Tinuvin™ 460 and CGS20 from BASF; Floorstab™ UV range (UV-1, UV-2, UV-5 and UV-8) from Kromachem Ltd, Additol™ S range (S100, S110, S120 and S130) from Cytec Surface Specialties.

Since excessive addition of these polymerization inhibitors will lower the ink sensitivity to curing, it is preferred that the amount capable of preventing polymerization is determined prior to blending. The amount of a polymerization inhibitor is preferably lower than 2 wt % of the total UV curable inkjet ink.

In a preferred embodiment, the polymerization inhibitor is a polymerizable inhibitor, preferably containing one or more acrylate groups for achieving good reactivity.

Surfactants

The UV curable inkjet ink may contain at least one surfactant. The surfactant can be anionic, cationic, non-ionic, or zwitter-ionic and is preferably added in a total quantity less than 3 wt %, more preferably less than 2 wt %, and most preferably no more than 1 wt % based on the total weight of the UV curable inkjet ink.

Preferred surfactants are selected from fluoro surfactants (such as fluorinated hydrocarbons) and silicone surfactants. The silicone surfactants are preferably siloxanes and can be alkoxylated, polyester modified, polyether modified, polyether modified hydroxy functional, amine modified, epoxy modified and other modifications or combinations thereof. Preferred siloxanes are polymeric, for example polydimethylsiloxanes.

Preferred commercial silicone surfactants include BYK™ 333 and BYK™ UV3510 from BYK Chemie and Tego-glide™ 410 from EVONIK.

In a preferred embodiment, the surfactant is a polymerizable compound.

Preferred polymerizable silicone surfactants include a (meth)acrylated silicone surfactant. Most preferably the (meth)acrylated silicone surfactant is an acrylated silicone surfactant, because acrylates are more reactive than methacrylates.

In a preferred embodiment, the (meth)acrylated silicone surfactant is a polyether modified (meth)acrylated polydimethylsiloxane or a polyester modified (meth)acrylated polydimethylsiloxane.

Preferred commercially available (meth)acrylated silicone surfactants include: Ebecryl™ 350, a silicone diacrylate from Cytec; the polyether modified acrylated polydimethylsiloxane BYK™ UV3500 and BYK™ UV3530, the polyester modified acrylated polydimethylsiloxane BYK™ UV3570, all manufactured by BYK Chemie; Tego™ Rad 2100, Tego™ Rad 2200N, Tego™ Rad 2250N, Tego™ Rad 2300, Tego™ Rad 2500, Tego™ Rad 2600, and Tego™ Rad 2700, Tego™ RC711 from EVONIK; Silaplane™ FM7711, Silaplane™ FM7721, Silaplane™ FM7731, Silaplane™ FM0711, Silaplane™ FM0721, Silaplane™ FM0725, Silaplane™ TM0701, Silaplane™ TM0701T all manufactured by Chisso Corporation; and DMS-R05, DMS-R11, DMS-R18, DMS-R22, DMS-R31, DMS-U21, DBE-U22, SIB1400, RMS-044, RMS-033, RMS-083, UMS-182, UMS-992, UCS-052, RTT-1011 and UTT-1012 all manufactured by Gelest, Inc.

Other Additives

The UV curable inkjet inks may contain other components than those mentioned above. Such components may include a solvent, an ultraviolet absorbent, an antioxidant, a polymer compound, a matting agent, a wax and the like for adjusting the film properties of the jetted ink.

Manufacturing Methods of Inkjet Inks

Pigment dispersions may be prepared by precipitating or milling the pigment in the dispersion medium in the presence of the dispersant.

A method of manufacturing a UV curable inkjet ink preferable includes the steps of a) milling a colour pigment in the presence of a polymeric dispersant and a polymerizable compound into a concentrated pigment dispersion; and b) diluting the concentrated pigment dispersion with polymerizable compounds so that UV curable inkjet inks are obtained as disclosed above.

Mixing apparatuses may include a pressure kneader, an open kneader, a planetary mixer, a dissolver, and a Dalton Universal Mixer. Suitable milling and dispersion apparatuses are a ball mill, a pearl mill, a colloid mill, a high-speed disperser, double rollers, a bead mill, a paint conditioner, and triple rollers. The dispersions may also be prepared using ultrasonic energy.

Many different types of materials may be used as milling media, such as glasses, ceramics, metals, and plastics. In a preferred embodiment, the grinding media can comprise particles, preferably substantially spherical in shape, e.g. beads consisting essentially of a polymeric resin or more preferably yttrium stabilized zirconium beads.

In the process of mixing, milling and dispersion, each process is preferably performed with cooling to prevent build-up of heat, and as much as possible under light conditions in which actinic radiation has been substantially excluded.

The pigment dispersion may contain more than one pigment. Such a pigment dispersion may be prepared using separate dispersions for each pigment, or alternatively several pigments may be mixed and co-milled in preparing the dispersion.

The dispersion process can be carried out in a continuous, batch or semi-batch mode.

The preferred amounts and ratios of the ingredients of the mill grind will vary depending upon the specific materials. The contents of the milling mixture comprise the mill grind and the milling media. The mill grind comprises pigment, polymeric dispersant and a liquid carrier.

The milling time can vary widely and depends upon the pigment, the selected mechanical means and residence conditions, the initial and desired final particle size, etc. In the present invention pigment dispersions with an average particle size of less than 100 nm may be prepared.

After milling is completed, the milling media is separated from the milled particulate product (in either a dry or liquid dispersion form) using conventional separation techniques, such as by filtration, sieving through a mesh screen, and the like. Often the sieve is built into the mill, e.g. for a bead mill. The milled pigment concentrate is preferably separated from the milling media by filtration.

In general, it is desirable to make inkjet inks in the form of a concentrated mill grind, which is subsequently diluted to the appropriate concentration for use in the inkjet printing system. This technique permits preparation of a greater quantity of pigmented ink from the equipment. By dilution, the inkjet ink is adjusted to, for example, the desired viscosity, surface tension.

Inkjet Printing Devices

The UV curable inkjet inks may be jetted by print heads ejecting small droplets of ink in a controlled manner through nozzles onto an ink-receiver surface, which is moving relative to the print head(s).

A preferred print head for an inkjet printing system in the present invention is a piezoelectric head. Piezoelectric inkjet printing is based on the movement of a piezoelectric ceramic transducer when a voltage is applied thereto. The application of a voltage changes the shape of the piezoelectric ceramic transducer in the print head creating a void, which is then filled with ink. When the voltage is again removed, the ceramic expands to its original shape, creating a pressure wave which leads to the formation of a drop ejected from the nozzle of a print head.

However, the inkjet printing method in the present invention is not restricted to piezoelectric inkjet printing. Other inkjet print heads can be used and include various types, such as a continuous type and a thermal or electrostatic drop on demand type.

The print head is preferably a piezo electric through-flow print head, more preferably greyscale piezo electric through-flow print head. In a through-flow print head, often also called a recirculating print head, the ink flows continuously via an ink inlet through the ink chamber and exits the nozzle only when required, otherwise the ink continuously exits the ink channel via an ink outlet of the print head. The other type of print head is a so-called end shooter print head or single ended print head, wherein the ink flows via an ink inlet of the print head into the ink chamber and can only exit through a nozzle. An advantage of a piezo electric through-flow print head is that sedimentation of colour pigments in the nozzles is reduced, thus improving reliability and productivity of the inkjet printing system. Suitable piezoelectric through-flow print heads include the print heads Samba G3L and G5L from FUJI DIMATIX and the through-flow print heads from XAAR.

For obtaining good image quality, greyscale print heads are preferred as they can generate different sized droplets by selectively activating different pulses of a wave form. A wave form is a set of timed actuator movements used to propagate and control acoustic pressure waves within an ink chamber of a greyscale print head to eject an ink droplet through a nozzle.

The greyscale print heads preferably have nozzles with an outer nozzle surface area NS smaller than 500 $\mu m^2$, more preferably between 100 and 350 $\mu m^2$ and most preferably between 200 and 250 $\mu m^2$. In these ranges, the greyscale print heads can produce images of excellent image quality. The nozzle surface area NS is calculated based on the dimensions of the outer nozzle using well-known mathematical formulas for surface areas. For example, in case of a circular nozzle, the nozzle surface area NS is calculated by the formula: $NS=\pi \times r^2$, wherein the radius r is half of the outer nozzle diameter.

In multi-pass printing, the inkjet print head scans back and forth in a transversal direction across the moving ink-receiver surface. However, inkjet printing is preferably performed by a single pass printing process for increasing productivity. This can be performed by using page wide inkjet print heads or multiple staggered inkjet print heads which cover the entire width of the ink-receiver surface. In a single pass printing process, the inkjet print heads preferably remain stationary while the ink-receiver surface is transported under the inkjet print heads.

The UV curable inkjet inks of the present invention are cured by exposing them to ultraviolet radiation. The UV curing means may be arranged in combination with the print head of the inkjet printer, travelling therewith so that the curable composition is exposed to curing radiation very shortly after been jetted.

The source of UV radiation may be arranged to move with the print head, but may also be an elongated radiation source extending transversely across the ink-receiver surface to be cured.

Any ultraviolet light source may be employed as long as part of the emitted light can be absorbed by the photo-initiator or photo-initiator system. Suitable UV radiation sources include a high or low pressure mercury lamp, a cold cathode tube, a black light, an ultraviolet LED, an ultraviolet laser, and a flash light. Of these, the preferred source is one exhibiting a relatively long wavelength UV-contribution having a dominant wavelength of 300-400 nm. Specifically, a UV-A light source is preferred due to the reduced light scattering therewith resulting in more efficient interior curing. UV radiation is generally classed as UV-A, UV-B, and UV-C as follows:

UV-A: 400 nm to 320 nm
UV-B: 320 nm to 290 nm
UV-C: 290 nm to 100 nm.

It is possible to cure the image using, consecutively or simultaneously, two light sources of differing wavelength or illuminance. For example, the first UV-source can be selected to be rich in UV-C, in particular in the range of 260 nm-200 nm. The second UV-source can then be rich in UV-A, e.g. a gallium-doped lamp, or a different lamp high in both UV-A and UV-B. The use of two UV-sources has been found to have advantages e.g. a fast curing speed and a high curing degree.

In a preferred embodiment, the inkjet printing device contains UV LEDs with a wavelength larger than 360 nm, preferably UV LEDs with a wavelength between 370 nm and 405 nm. The use of UV LEDs is beneficial for productivity as they consume less energy than other UV light sources, such as a mercury bulb.

For facilitating curing, the inkjet printer may include one or more oxygen depletion units. The oxygen depletion units place a blanket of nitrogen or other relatively inert gas (e.g. $CO_2$), with adjustable position and adjustable inert gas concentration, in order to reduce the oxygen concentration in the curing environment. Residual oxygen levels are usually maintained as low as 200 ppm, but are generally in the range of 200 ppm to 1200 ppm. The productivity of inkjet printing is improved as this allows for faster curing and/or reducing the energy consumption of the UV radiation sources.

INDUSTRIAL APPLICABILITY

The UV curable inkjet ink set and inkjet printing methods are preferably used for manufacturing decorative panels.

In one embodiment, the UV curable inkjet ink set and inkjet printing methods is preferably used for interior decoration (home, office, showroom . . . ) for edge band, base plates or skirting, window blinds, wall panels, ceiling panels, division walls, furniture panels, doors; and even for printing on glass when using a primer, which may be an analog primer or digital primer. The interior decoration includes also the interior parts of transporting means, such as cars, trucks, planes, trains and boats. In the latter decorations may be inkjet printed in a broad range of designs, including wood grain designs, on panels for dashboards, gear boxes coverings, door panels, etc.

In another embodiment, the UV curable inkjet ink set and inkjet printing methods is preferably used for outdoor decoration, by using a protective overcoat. The protective overcoat may be an UV inkjet ink varnish.

Decorative Panels

The decorative panels are preferably selected from the group consisting of kitchen panels, flooring panels, furniture panels, ceiling panels and wall panels, but also include other type of panels, such as doors in a room.

In a preferred embodiment, the decorative panel is an edge band panel. Edge band is used to cover and protect the exposed sides of decorative panels such as plywood, particle board or MDF. It provides an increased durability and gives the appearance of a solid or more valuable material. Edge bands can be made of different materials including PVC, ABS, PP, acrylic, melamine, wood or wood veneer.

Edge band is preferably applied to a substrate, e.g. a cabinet door, by an automated process using a hot-melt adhesive. Hot melt adhesives can be water or solvent based and may consist of various raw materials including EVA, PUR, PA, APOA, and PO. The machine that applies the edge banding is called an edge bander. An edge bander bonds the edge banding to the substrate, trims the leading and trailing edges, trims top and bottom flush with the substrate, scraps any surplus, and buffs the finished edge.

In the present invention, the preferred edge bands are so-called thermoplastic edge bands. They are produced with an extruder for melting plastics, which may include colour pigments, and shaping it through a die into the required size. After the edge band is extruded, it can be inkjet printed and lacquered to provide the required finish. The edge band is then rolled and send to customers. Suitable plastics includes PVC, ABS, PP and PMMA.

A decorative panel in accordance with the present invention includes an inkjet printed colour pattern printed with four inkjet inks as defined above.

There is no real restriction on the content of the colour pattern. The colour pattern may also contain information such as text, arrows, logo's and the like. The advantage of inkjet printing is that such information can be printed at low volume without extra cost, contrary to gravure printing.

In a preferred embodiment, the colour pattern is a wood reproduction or a stone reproduction, but it may also be a fantasy or creative pattern.

The decorative panel is preferably a furniture panel, more preferably an edge band panel containing polyvinylchloride (PVC), acrylonitrile butadiene styrene (ABS) or polypropylene (PP).

In a preferred embodiment the substrate is acrylonitrile butadiene styrene or polypropylene, which are chlorine free both during manufacturing and in the final product, and can therefore be regarded "green" polymers.

Unlike PVC, ABS may be incinerated with general waste, is lighter in weight and highly heat resistant. This thermoplastic material resists impact, which is especially important for office furniture applications Edge Band Manufacturing Methods In a preferred embodiment, the method of manufacturing a decorative panel includes the steps of a) jetting a colour pattern with inkjet inks from a UV curable inkjet ink set as described above claimed on a substrate, preferably selected from the group consisting of polyvinylchloride (PVC), acrylonitrile butadiene styrene (ABS) and polypropylene (PP); and b) UV curing the inkjet inks on the substrate using UV LEDs having an emission wavelength between 360 nm and 405 nm.

The manufacturing method preferably includes a step c) of applying a UV curable varnish. Such a varnish protects the inkjet printed colour pattern against scratches. The UV curable varnish may be applied by coating, but is preferably applied as an achromatic inkjet ink by inkjet printing in order to minimize waste. The step c) is preferably followed by a step d) of embossing the varnished edge band. This provides an aesthetic relief effect, for example, a wood nerve structure when a wood design is printed on the edge band.

As it is difficult to let the wood nerve structure correspond with the printed wood design, in a more preferred embodiment, the aesthetic relief effect is created in step c) by inkjet printing the UV curable varnish image wise onto the colour pattern, which makes the step d) obsolete.

EXAMPLES

Materials

All materials used in the following examples were readily available from standard sources such as Aldrich Chemical Co. (Belgium) and Acros (Belgium) unless otherwise specified.

PMIX is Cromophtal™ Jet Magenta 2BC which is a mixed crystal of C.I. Pigment Violet 19 and C.I. Pigment Red 202 available from CIBA-GEIGY.

PB15:4 is an abbreviation used for Hostaperm™ Blue P-BFS, a C.I. Pigment Blue 15:4 pigment from CLARIANT.

PY150 is an abbreviation used for Chromophtal™ Yellow LA2, a C.I. Pigment Yellow 150 from CIBA SPECIALTY CHEMICALS.

PB7 is an abbreviation used for Special Black™ 550, which is a carbon black available from EVONIK.

PR122 is the abbreviation for C.I. Pigment Red 122 for Ink Jet Magenta™ E02VP2621 from CLARIANT was used.

PO71 is the abbreviation for C.I. Pigment Orange 71 for Chromophtal™ Orange DPP from BASF was used.

PR254 is the abbreviation for C.I. Pigment Red 254 for which Irgazin™ DPP Red BTR from Ciba Specialty Chemicals was used.

PY139 is Graphtol™ Yellow H2R VP2284, a C.I. Pigment Yellow 139 from CLARIANT.

SYN is the dispersion aid according to Formula (A):

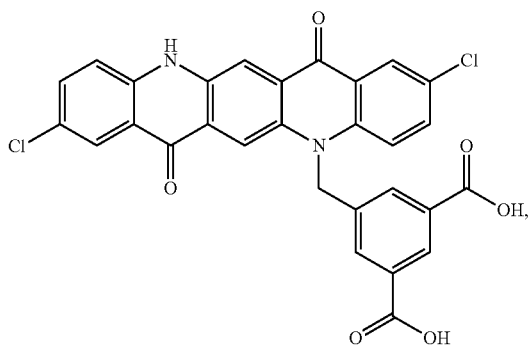

Formula (A)

and was synthesized in the same manner as described in Example 1 of WO 2007/060254 (AGFA GRAPHICS) for the synergist QAD-3.

DB162 is an abbreviation used for the polymeric dispersant Disperbyk™ 162 available from BYK CHEMIE GMBH whereof the solvent mixture of 2-methoxy-1-methylethylacetate, xylene and n-butylacetate was removed.

S35000 is SOLSPERSE™ 35000, a polyethyleneimine-polyester hyperdispersant from NOVEON.

DPGDA is dipropyleneglycol diacrylate from ARKEMA.

TMPTA is trimethylolpropane triacrylate available as Sartomer™ SR351 from ARKEMA.

DETX is a diethylthioxanthone available as Genocure™ DETX from RAHN.

TPO-L is ethyl phenyl(2,4,6-trimethylbenzoyl)phosphinate available as Omnirad™ TPO-L from IGM Resins BV.

I819 is a bis(2,4,6-trimethylbenzoyl)-phenylphosphineoxide photoinitiator available as Irgacure™ 819 from BASF.

TPO is trimethylbenzoyl diphenyl phosphine oxide supplied as Omnirad™ TPO by IGM Resins BV.

CN3715 is an amine co-initiator available as CN3715LM™ (CASC159034-91-0) from ARKEMA.

EPD is ethyl 4-dimethylaminobenzoate available as GENOCURE™ EPD from RAHN AG.

INHIB is a mixture forming a polymerization inhibitor having a composition according to Table 3.

TABLE 3

| Component | wt % |
|---|---|
| DPGDA | 82.4 |
| p-methoxyphenol | 4.0 |
| BHT | 10.0 |
| Cupferron ™ AL | 3.6 |

Cupferron™ AL is aluminum N-nitrosophenylhydroxylamine from WAKO CHEMICALS LTD.

BYK™ UV3510 is a polyether modified polydimethylsiloxane wetting agent available from BYK Chemie.

PGA is a 140 g/m² white paper substrate coated on both sides with 20 g/m² of polyethylene available from Mondi Belcoat NV Coating division. The CIE L* a* b* coordinates of PGA were measured and are shown in Table 4.

TABLE 4

| CIE L* a* b* | Value |
|---|---|
| L* | 95.97 |
| a* | 0.40 |
| b* | −0.14 |

Measurement Methods

1. Average Particle Size

The average particle size of pigment particles was determined by photon correlation spectroscopy at a wavelength of 633 nm with a 4 mW HeNe laser on a diluted sample of the inkjet ink. The particle size analyzer used was a Malvern™ Nano-S available from Goffin-Meyvis.

The sample was prepared by addition of one drop of ink to a cuvette containing 1.5 mL ethyl acetate and mixed until a homogenous sample was obtained. The measured particle size is the average value of 3 consecutive measurements consisting of 6 runs of 20 seconds.

For good ink jet characteristics (jetting characteristics and print quality) the average particle size of the dispersed particles is preferably less than 200 nm, preferably between 80 and 180 nm.

2. Colour Measurements

In the CIELAB colour space, a colour is defined using three terms L*, a*, and b*. L* defines the lightness of a colour, and it ranges from zero (black) to 100 (white). The terms a* and b*, together, define the hue. The term a* ranges from a negative number (green) to a positive number (red). The term b* ranges from a negative number (blue) to a positive number (yellow). Additional terms such as hue angle H* and chroma C* are used to further describe a given colour, wherein:

$$H^* = \tan^{-1}(b^*/a^*) \qquad \text{equation 1}$$

$$C^* = (a^{*2} + b^{*2})^{1/2} \qquad \text{equation 2.}$$

Using the standard calculation for the hue angle with $\tan^{-1}(b^*/a^*)$, positive signed results are generated for the first quadrant [+a*,+b*] only. The other quadrants should be handled so that a 360° representation is accommodated and results are expressed as positive signed numbers. Second quadrant [−a*,+b*] and third quadrant [−a*,−b*] calculations should be: hue=180°+$\tan^{-1}(b^*/a^*)$. Fourth quadrant [+a*,−b*] calculations should be: hue=360°+$\tan^{-1}(b^*/a^*)$.

In the CIELAB colour space, ΔE* defines the "colour-distance", i.e. the difference between two colours. The higher the ΔE* number, the more difference between the two colours:

$$\Delta E^* = (\Delta L^{*2} + \Delta a^{*2} + \Delta b^{*2})^{1/2} \qquad \text{equation 3.}$$

An inkjet ink was coated on a PGA substrate with a bar coater at a wet thickness of 10 μm and then UV cured twice on a Fusion DRSE-120 conveyer using a D bulb at full power (600 mJ/cm²) and a belt speed of 20 m/min.

The reflectance spectrum of a coated sample was measured three times with a Gretag SPM50 spectrophotometer in the range from 380 up to 730 nm in steps of 10 nm. Calculation involved the reflectance spectrum of the sample in combination with the light source spectrum. The CIE L*a*b* coordinates as well as the chroma C*, the hue angle H* and the colour distance ΔE* were calculated for a 2° observer under a D50 light source.

3. Surface Tension

The surface tension of the inkjet inks was measured with a KRÜSS tensiometer K9 at 25° C. after 60 seconds.

Example 1

In this example, the effect by the invention on the colour inconstancy between curing and 24 hours after curing is illustrated for chromatic inkjet inks having a hue angle H* between 180° and 360°.

Preparation of Concentrated Pigment Dispersion CPM

A dispersion was made by mixing the components according to Table 5 for 30 minutes using a DISPERLUX™ disperser from DISPERLUX S.A.R.L., Luxembourg. The dispersion was then milled using a Bachofen DYNOMILL ECM mill filled for 42% with 0.4 mm yttrium stabilized zirconia beads ("high wear resistant zirconia grinding media" from TOSOH Co.). The mixture was circulated over the mill to have a residence time of 55 min. After milling, the concentrated pigment dispersion was discharged over a 1 μm filter into a vessel and found to have 106 nm.

TABLE 5

| Component | Quantity (wt %) |
|---|---|
| PMIX | 15.00 |
| SYN | 0.80 |
| DB162 | 15.00 |
| INHIB | 1.00 |
| DPGDA | 68.20 |

Preparation of Concentrated Pigment Dispersion CPC

A concentrated cyan pigment dispersion was prepared by mixing for 30 minutes the components according to Table 6 using a DISPERLUX™ disperser from DISPERLUX S.A.R.L., Luxembourg. The vessel was then connected to a Bachofen DYNOMILL™ ECM Poly mill having an internal volume of 8.2 L filled for 42% with 0.4 mm yttrium stabilized zirconia beads. The mixture was circulated over the mill at a flow rate of about 8 L per minute to have a residence time of 38 min. After milling the dispersion was separated from the beads using a 1 μm filter and found to have an average particle size of 102 nm.

TABLE 6

| Component | Quantity (wt %) |
|---|---|
| PB15:4 | 12.00 |
| DB162 | 12.00 |
| INHIB | 1.00 |
| DPGDA | 75.00 |

Preparation of Inkjet Inks

The inkjet inks M-1 to M-12 were prepared in the same manner by mixing the components according to Table 7 and Table 8 using the concentrated pigment dispersion CPM.

TABLE 7

| wt % of Component | M-1 | M-2 | M-3 | M-4 | M-5 | M-6 |
|---|---|---|---|---|---|---|
| PMIX | 2.53 | 2.53 | 2.53 | 2.53 | 2.53 | 2.53 |
| SYN | 0.13 | 0.13 | 0.13 | 0.13 | 0.13 | 0.13 |
| DB162 | 2.53 | 2.53 | 2.53 | 2.53 | 2.53 | 2.53 |
| DPGDA | 74.81 | 76.81 | 76.81 | 75.81 | 74.31 | 77.81 |
| DETX | 4.00 | 2.00 | 4.00 | 4.00 | 2.00 | 2.00 |
| TPO-L | 5.00 | 5.00 | 5.00 | 5.00 | 7.50 | 5.00 |
| I819 | 4.00 | 4.00 | 4.00 | 3.00 | 4.00 | 3.00 |
| CN3715 | 5.00 | 5.00 | 3.00 | 5.00 | 5.00 | 5.00 |
| INHIB | 1.00 | 1.00 | 1.00 | 1.00 | 1.00 | 1.00 |
| BYK ™ UV3510 | 1.00 | 1.00 | 1.00 | 1.00 | 1.00 | 1.00 |

TABLE 8

| wt % of Component | M-7 | M-8 | M-9 | M-10 | M-11 | M-12 |
|---|---|---|---|---|---|---|
| PMIX | 2.53 | 2.53 | 2.53 | 2.53 | 2.53 | 2.53 |
| SYN | 0.13 | 0.13 | 0.13 | 0.13 | 0.13 | 0.13 |
| DB162 | 2.53 | 2.53 | 2.53 | 2.53 | 2.53 | 2.53 |
| DPGDA | 77.31 | 78.81 | 78.31 | 78.81 | 79.31 | 79.31 |
| DETX | 2.00 | 1.00 | 1.00 | 0.50 | 0.50 | — |
| TPO-L | 7.50 | 5.00 | 7.50 | 7.50 | 5.00 | 7.50 |
| I819 | 3.00 | 3.00 | 3.00 | 3.00 | 3.00 | 3.00 |
| CN3715 | 3.00 | 5.00 | 3.00 | 3.00 | 5.00 | 3.00 |
| INHIB | 1.00 | 1.00 | 1.00 | 1.00 | 1.00 | 1.00 |
| BYK ™ UV3510 | 1.00 | 1.00 | 1.00 | 1.00 | 1.00 | 1.00 |

The inkjet inks C-1 to C-12 were prepared in the same manner by mixing the components according to Table 9 and Table 10 using the concentrated pigment dispersion CPC.

TABLE 9

| wt % of Component | C-1 | C-2 | C-3 | C-4 | C-5 | C-6 |
|---|---|---|---|---|---|---|
| PB15:4 | 2.25 | 2.25 | 2.25 | 2.25 | 2.25 | 2.25 |
| DB162 | 2.25 | 2.25 | 2.25 | 2.25 | 2.25 | 2.25 |
| DPGDA | 75.50 | 77.50 | 77.50 | 76.50 | 75.00 | 78.50 |
| DETX | 4.00 | 2.00 | 4.00 | 4.00 | 2.00 | 2.00 |
| TPO-L | 5.00 | 5.00 | 5.00 | 5.00 | 7.50 | 5.00 |
| I819 | 4.00 | 4.00 | 4.00 | 3.00 | 4.00 | 3.00 |
| CN3715 | 5.00 | 5.00 | 3.00 | 5.00 | 5.00 | 5.00 |
| INHIB | 1.00 | 1.00 | 1.00 | 1.00 | 1.00 | 1.00 |
| BYK ™ UV3510 | 1.00 | 1.00 | 1.00 | 1.00 | 1.00 | 1.00 |

TABLE 10

| wt % of Component | C-7 | C-8 | C-9 | C-10 | C-11 | C-12 |
|---|---|---|---|---|---|---|
| PB15:4 | 2.25 | 2.25 | 2.25 | 2.25 | 2.25 | 2.25 |
| DB162 | 2.25 | 2.25 | 2.25 | 2.25 | 2.25 | 2.25 |
| DPGDA | 78.00 | 80.00 | 79.50 | 79.50 | 79.00 | 80.00 |
| DETX | 2.00 | 0.50 | 1.00 | 0.50 | 1.00 | — |
| TPO-L | 7.50 | 5.00 | 5.00 | 7.50 | 7.50 | 7.50 |
| I819 | 3.00 | 3.00 | 3.00 | 3.00 | 3.00 | 3.00 |
| CN3715 | 3.00 | 5.00 | 5.00 | 3.00 | 3.00 | 3.00 |
| INHIB | 1.00 | 1.00 | 1.00 | 1.00 | 1.00 | 1.00 |
| BYK ™ UV3510 | 1.00 | 1.00 | 1.00 | 1.00 | 1.00 | 1.00 |

Evaluation and Results

For each of the inkjet inks M-1 to M-2 and C-1 to C-12, the colour distance ΔE* was determined directly after curing and after 24 hours. For good colour constancy, the ΔE* should not be larger than 1.00. The ratio T/P represents the wt % of DETX to the wt % of pigment, both wt % based on the total weight of the inkjet ink.

TABLE 11

| | | Time of Measurement | | | | | |
|---|---|---|---|---|---|---|---|
| | | After UV curing | | | 24 hours after UV curing | | |
| Ink | T/P | L* | a* | b* | L* | a* | b* | ΔE* |
| M-1 | 1.58 | 58.90 | 72.15 | −4.00 | 58.97 | 73.07 | −7.81 | 3.92 |
| M-2 | 0.79 | 59.01 | 72.93 | −7.29 | 59.06 | 73.59 | −10.00 | 2.79 |
| M-3 | 1.58 | 58.65 | 72.02 | −3.15 | 58.80 | 72.88 | −7.13 | 4.07 |
| M-4 | 1.58 | 58.81 | 72.10 | −3.83 | 58.86 | 73.16 | −7.84 | 4.15 |
| M-5 | 0.79 | 59.01 | 72.77 | −7.03 | 59.20 | 73.36 | −10.00 | 3.03 |
| M-6 | 0.79 | 58.63 | 73.26 | −6.77 | 58.67 | 74.09 | −9.89 | 3.23 |
| M-7 | 0.79 | 58.76 | 72.60 | −6.18 | 58.93 | 73.54 | −9.49 | 3.45 |
| M-8 | 0.40 | 59.41 | 73.38 | −10.39 | 59.43 | 73.75 | −12.11 | 1.76 |
| M-9 | 0.40 | 59.43 | 73.06 | −10.22 | 59.50 | 73.46 | −11.96 | 1.79 |
| M-10 | 0.20 | 59.52 | 73.51 | −12.16 | 59.56 | 73.82 | −13.04 | 0.93 |
| M-11 | 0.20 | 59.55 | 73.74 | −12.38 | 59.60 | 73.84 | −13.16 | 0.79 |
| M-12 | 0.00 | 59.37 | 74.46 | −14.02 | 59.31 | 74.41 | −14.08 | 0.10 |

From Table 11, it should be clear that only the inkjet inks M-10 to M-12 having a T/P ratio of no more than 0.20 exhibit good colour constancy after UV curing.

TABLE 12

| Ink | T/P | After UV curing | | | 24 hours after UV curing | | | ΔE* |
|---|---|---|---|---|---|---|---|---|
| | | L* | a* | b* | L* | a* | b* | |
| C-1 | 1.78 | 51.80 | −48.76 | −43.89 | 52.34 | −45.15 | −48.47 | 5.86 |
| C-2 | 0.89 | 51.82 | −45.73 | −47.84 | 52.17 | −43.06 | −51.01 | 4.16 |
| C-3 | 1.78 | 51.97 | −48.62 | −44.01 | 52.57 | −45.84 | −47.75 | 4.70 |
| C-4 | 1.78 | 51.72 | −48.75 | −44.03 | 52.35 | −45.05 | −48.67 | 5.97 |
| C-5 | 0.89 | 51.85 | −45.69 | −47.59 | 52.28 | −43.27 | −50.65 | 3.92 |
| C-6 | 0.89 | 52.29 | −46.08 | −47.22 | 52.73 | −43.23 | −50.75 | 4.56 |
| C-7 | 0.89 | 51.94 | −46.08 | −46.83 | 52.51 | −43.52 | −50.37 | 4.41 |
| C-8 | 0.22 | 52.72 | −41.34 | −53.00 | 52.82 | −40.51 | −53.93 | 1.25 |
| C-9 | 0.44 | 52.61 | −43.23 | −50.89 | 52.78 | −41.48 | −52.78 | 2.58 |
| C-10 | 0.22 | 52.73 | −41.51 | −52.70 | 52.94 | −40.81 | −53.63 | 1.18 |
| C-11 | 0.44 | 52.43 | −43.19 | −50.83 | 52.67 | −41.77 | −52.56 | 2.25 |
| C-12 | 0 | 52.69 | −39.31 | −55.18 | 52.72 | −39.34 | −55.18 | 0.04 |

Only the inkjet ink C-12 having a T/P ratio of no more than 0.20 in Table 12 exhibits good colour constancy after UV curing. The inkjet inks C-8 and C-10 having a T/P ratio just slightly higher than 0.20 exhibit a colour inconstancy after UV curing that is unacceptable.

Example 2

This example illustrates two similar UV curable inkjet ink sets A and B, wherein ink set B has been adapted to minimize colour inconstancy caused by the UV curing process of the inkjet inks.

Preparation of Concentrated Pigment Dispersion CPWRA

A concentrated pigment dispersion CPWRA was prepared by mixing for 30 minutes the components according to Table 13 using a DISPERLUX™ disperser from DISPERLUX S.A.R.L., Luxembourg. The vessel was then connected to a Bachofen DYNOMILL™ ECM AP2 mill filled for 42% with 0.4 mm yttrium stabilized zirconia beads. The mixture was circulated over the mill at a flow rate of about 2 L per minute to have a residence time of 28 min. After milling the dispersion was separated from the beads using a 1 µm filter and found to have an average particle size of 126 nm.

TABLE 13

| Component | Quantity (wt %) |
|---|---|
| PR122 | 5.30 |
| PO71 | 4.90 |
| PR254 | 4.30 |
| SYN | 1.00 |
| S35000 | 15.00 |
| INHIB | 1.00 |
| DPGDA | 68.50 |

Preparation of Concentrated Pigment Dispersion CPWRB

A concentrated pigment dispersion CPWRB was prepared by mixing for 30 minutes the components according to Table 14 using a DISPERLUX™ disperser from DISPERLUX S.A.R.L., Luxembourg. The vessel was then connected to a Bachofen DYNOMILL™ ECM AP2 mill filled for 42% with 0.4 mm yttrium stabilized zirconia beads. The mixture was circulated over the mill at a flow rate of about 2 L per minute to have a residence time of 28 min. After milling the dispersion was separated from the beads using a 1 µm filter and found to have an average particle size of 98 nm.

TABLE 14

| Component | Quantity (wt %) |
|---|---|
| PR122 | 5.30 |
| PO71 | 4.90 |
| PR254 | 4.80 |
| SYN | 1.00 |
| DB162 | 15.00 |
| INHIB | 1.00 |
| DPGDA | 68.00 |

Preparation of Concentrated Pigment Dispersion CPWYA

A concentrated pigment dispersion CPWYA was prepared by mixing for 30 minutes the components according to Table 15 using a DISPERLUX™ disperser from DISPERLUX S.A.R.L., Luxembourg. The vessel was then connected to a Bachofen DYNOMILL™ ECM AP2 mill filled for 42% with 0.4 mm yttrium stabilized zirconia beads. The mixture was circulated over the mill at a flow rate of about 2 L per minute to have a residence time of 55 min. After milling the dispersion was separated from the beads using a 1 µm filter and found to have an average particle size of 164 nm.

TABLE 15

| Component | Quantity (wt %) |
|---|---|
| PY139 | 7.25 |
| PO71 | 5.50 |
| SYN | 0.75 |
| S35000 | 5.00 |
| INHIB | 1.00 |
| DPGDA | 80.50 |

Preparation of Concentrated Pigment Dispersion CPWYB

A concentrated pigment dispersion CPWYB was prepared by mixing for 30 minutes the components according to Table 16 using a DISPERLUX™ disperser from DISPERLUX S.A.R.L., Luxembourg. The vessel was then connected to a Bachofen DYNOMILL™ ECM AP2 mill filled for 42% with 0.4 mm yttrium stabilized zirconia beads. The mixture was circulated over the mill at a flow rate of about 2 L per minute to have a residence time of 55 min. After milling the dispersion was separated from the beads using a 1 µm filter and found to have an average particle size of 132 nm.

TABLE 16

| Component | Quantity (wt %) |
|---|---|
| PY139 | 8.55 |
| PO71 | 6.45 |
| SYN | 1.00 |
| DB162 | 15.00 |
| INHIB | 1.00 |
| DPGDA | 68.00 |

Preparation of Concentrated Pigment Dispersion CPY

A concentrated pigment dispersion CPY was prepared by mixing for 30 minutes the components according to Table 17 using a DISPERLUX™ disperser from DISPERLUX S.A.R.L., Luxembourg. The vessel was then connected to a Bachofen DYNOMILL™ ECM Poly mill having an internal volume of 8.2 L filled for 42% with 0.4 mm yttrium stabilized zirconia beads. The mixture was circulated over the mill at a flow rate of about 8 L per minute to have a residence time of 28 min. After milling the dispersion was separated from the beads using a 1 µm filter and found to have an average particle size of 166 nm.

TABLE 17

| Component | Quantity (wt %) |
|---|---|
| PY150 | 15.00 |
| DB162 | 15.00 |
| INHIB | 1.00 |
| DPGDA | 69.00 |

Preparation of Concentrated Pigment Dispersion CPK

A concentrated pigment dispersion CPK was prepared by mixing for 30 minutes the components according to Table 18 using a DISPERLUX™ disperser from DISPERLUX S.A.R.L., Luxembourg. The vessel was then connected to a Bachofen DYNOMILL™ ECM Poly mill having an internal volume of 8.2 L filled for 42% with 0.4 mm yttrium stabilized zirconia beads. The mixture was circulated over the mill at a flow rate of about 8 L per minute to have a residence time of 48 min. After milling the dispersion was separated from the beads using a 1 μm filter and found to have an average particle size of 103 nm.

TABLE 18

| Component | Quantity (wt %) |
|---|---|
| PB7 | 8.72 |
| PB15:4 | 3.14 |
| PMIX | 3.14 |
| SYN | 0.75 |
| DB162 | 15.00 |
| INHIB | 1.00 |
| DPGDA | 68.25 |

UV Curable Ink Set A

The concentrated pigment dispersions prepared above in Examples 1 and 2 were combined with the components according to Table 19 to deliver the comparative inkjet ink set A. All wt % are based on the total weight of each inkjet ink.

TABLE 19

| wt % of Component | C | M | Y | K | WY | WR |
|---|---|---|---|---|---|---|
| PB15:4 | 2.25 | | | 0.76 | | |
| PMIX | | 2.53 | | 0.76 | | |
| SYN | | | 0.13 | 0.18 | 0.03 | 0.06 |
| PY150 | | | 3.19 | | | |
| PB7 | | | | 2.11 | | |
| PO71 | | | | | 0.22 | 0.29 |
| PY139 | | | | | 0.29 | |
| PR122 | | | | | | 0.31 |
| PR254 | | | | | | 0.28 |
| DB162 | 2.25 | 2.53 | 3.19 | 3.63 | | |
| S35000 | | | | | 0.20 | 0.35 |
| DPGDA | 75.50 | 74.81 | 73.62 | 72.56 | 63.60 | 68.27 |
| TMPTA | | | | | 16.70 | 11.50 |
| TPO-L | 5.00 | 5.00 | 5.00 | 5.00 | 5.00 | 5.00 |
| I819 | 4.00 | 4.00 | 4.00 | 4.00 | 3.00 | 3.00 |
| TPO | | | | | 2.95 | 2.95 |
| DETX | 4.00 | 4.00 | 4.00 | 4.00 | | |
| CN3715 | 5.00 | 5.00 | 5.00 | 5.00 | | |
| EPD | | | | | 6.00 | 6.00 |
| INHIB | 1.00 | 1.00 | 1.00 | 1.00 | 1.00 | 1.00 |
| BYK ™ UV3510 | 1.00 | 1.00 | 1.00 | 1.00 | 1.00 | 1.00 |

UV Curable Ink Set B

The concentrated pigment dispersions prepared above in Examples 1 and 2 were combined with the components according to Table 20 to deliver the inventive inkjet ink set B. All wt % are based on the total weight of each inkjet ink.

TABLE 20

| Component | C | M | Y | K | WY | WR |
|---|---|---|---|---|---|---|
| PB15:4 | 2.25 | | | 0.46 | | |
| PMIX | | 2.53 | | 0.46 | | |
| SYN | | | 0.13 | 0.11 | 0.04 | 0.07 |
| PY150 | | | 3.19 | | | |
| PB7 | | | | 1.27 | | |
| PO71 | | | | | 0.26 | 0.34 |
| PY139 | | | | | 0.35 | |
| PR122 | | | | | | 0.37 |
| PR254 | | | | | | 0.34 |
| DB162 | 2.25 | 2.53 | 3.19 | 2.18 | 0.61 | 1.05 |
| DPGDA | 80.00 | 79.31 | 78.12 | 80.02 | 67.79 | 71.88 |
| TMPTA | | | | | 15.00 | 10.00 |
| TPO-L | 7.50 | 7.50 | 5.00 | 5.00 | 7.95 | 7.95 |
| I819 | 3.00 | 3.00 | 3.50 | 3.50 | 3.00 | 3.00 |
| DETX | | | 2.00 | 2.00 | | |
| CN3715 | 3.00 | 3.00 | 5.00 | 5.00 | 3.00 | 3.00 |
| INHIB | 1.00 | 1.00 | 1.00 | 1.00 | 1.00 | 1.00 |
| BYK ™ UV3510 | 1.00 | 1.00 | 1.00 | 1.00 | 1.00 | 1.00 |

Evaluation and Results

For both UV curable inkjet ink sets A and B, the colour distance ΔE* was determined directly after curing and after 24 hours. For good colour constancy, the ΔE* should not be larger than 1.00. The ratio T/P represents the wt % (weight percentage) of DETX to the wt % of pigment, both wt % based on the total weight of the inkjet ink.

The results obtained for the comparative UV curable inkjet ink set A are given in Table 21.

TABLE 21

| Time of Measurement | CieLab | C | M | Y | K | WY | WR |
|---|---|---|---|---|---|---|---|
| After UV curing | L* | 53.44 | 59.31 | 90.37 | 12.04 | 86.83 | 68.55 |
| | a* | −51.03 | 70.84 | −6.57 | 0.84 | 12.45 | 48.60 |
| | b* | −39.72 | −0.53 | 92.47 | 1.01 | 52.35 | 21.81 |
| | C* | 65 | 71 | 93 | 1 | 54 | 53 |
| | H* | 218 | 359 | 94 | 50 | 77 | 24 |
| 24 hours after UV curing | L* | 54.03 | 59.42 | 90.72 | 11.96 | 87.16 | 68.63 |
| | a* | −48.81 | 71.64 | −7.44 | 0.81 | 12.51 | 48.75 |
| | b* | −43.50 | −4.40 | 92.27 | 0.78 | 52.81 | 21.75 |
| | C* | 65 | 72 | 93 | 1 | 54 | 53 |
| | H* | 222 | 356 | 95 | 44 | 77 | 24 |
| Ratio T/P | | 1.78 | 1.58 | 1.25 | 1.10 | 0.00 | 0.00 |
| Colour Distance ΔE* | | 4.42 | 3.95 | 0.96 | 0.25 | 0.57 | 0.18 |
| Surface Tension (mN/m) | | 21.8 | 22.4 | 22.1 | 22.3 | 22.4 | 22.6 |

The results obtained for the inventive UV curable inkjet ink set B are given in Table 22.

TABLE 22

| Time of Measurement | CieLab | C | M | Y | K | WY | WR |
|---|---|---|---|---|---|---|---|
| After UV curing | L* | 55.82 | 61.93 | 90.77 | 28.1 | 87.41 | 70.71 |
| | a* | −40.51 | 70.15 | −7.27 | 0.29 | 11.58 | 45.22 |
| | b* | −52.47 | −14.86 | 93.09 | 1.94 | 48.38 | 17.69 |
| | C* | 66 | 72 | 93 | 2 | 50 | 49 |
| | H* | 232 | 348 | 94 | 81 | 77 | 21 |
| 24 hours after UV curing | L* | 56.02 | 61.94 | 90.96 | 28.17 | 87.7 | 70.64 |
| | a* | −40.59 | 70.4 | −7.77 | 0.44 | 11.57 | 45.49 |
| | b* | −52.71 | −14.98 | 92.78 | 1.2 | 48.89 | 17.56 |
| | C* | 67 | 72 | 93 | 1 | 50 | 49 |
| | H* | 232 | 348 | 95 | 70 | 77 | 21 |
| Ratio T/P | | 0.00 | 0.00 | 0.63 | 0.92 | 0.00 | 0.00 |
| Colour Distance ΔE* | | 0.32 | 0.28 | 0.62 | 0.76 | 0.59 | 0.31 |
| Surface Tension (mN/m) | | 20.9 | 21.4 | 21.9 | 20.7 | 21.5 | 20.7 |

The results in Table 21 and Table 22 show that only the inventive UV curable inkjet ink set B was capable of producing images wherein the colour distance ΔE* is smaller than 1.00 for all inkjet inks. It should also be clear that ratio T/P only exhibits a major effect on the colour distance ΔE* for inkjet inks having a hue angle H* between 180° and 360°.

For both inkjet ink sets A and B, a mixture was made of the CMYK inkjet inks predominantly used for making vibrant colour designs. The mixture consisted of 25 wt % C ink+25 wt % M ink+25 wt % Y ink+25 wt % K ink, the wt % based on the total weight of the mixture. The mixtures were then coated on a PGA substrate with a bar coater at a wet thickness of 4 and 10 μm and UV cured on a Fusion DRSE-120 conveyer using a D bulb at full power (600 mJ/cm$^2$) and a belt speed of 20 m/min. For all samples, the colour distance ΔE* was calculated from CIELAB parameters determined directly after curing and after 24 hours.

TABLE 23

| | | Coating Thickness of Mixture of | | | |
|---|---|---|---|---|---|
| | | Ink set A | | Ink set B | |
| Time of Measurement | | 4 μm | 10 μm | 4 μm | 10 μm |
| after UV curing | L* | 46.72 | 36.03 | 56.10 | 47.59 |
| | a* | −8.23 | −9.30 | −9.29 | −10.61 |
| | b* | 6.82 | 6.95 | 8.85 | 9.84 |
| | C* | 11 | 12 | 13 | 14 |
| | H* | 140 | 143 | 136 | 137 |
| 24 hours after UV curing | L* | 46.71 | 36.13 | 55.97 | 47.58 |
| | a* | −8.20 | −9.35 | −9.30 | −10.61 |
| | b* | 5.90 | 6.02 | 8.51 | 9.46 |
| | C* | 10 | 11 | 13 | 14 |
| | H* | 144 | 147 | 138 | 138 |
| Colour Distance ΔE* | | 0.92 | 0.94 | 0.36 | 0.38 |

Table 23 illustrates that vibrant colour designs can be obtained exhibiting improved colour constancy with inkjet ink set B.

It was also found that wood designs, such as oak and cherry, could be printed with inkjet ink set B using the inkjet inks C, K, WY and WR that exhibited good colour constancy after UV curing and excellent metamerism.

The invention claimed is:

1. A UV curable pigmented inkjet ink set comprising:
   (i) one or more achromatic colour inkjet inks including a black inkjet ink containing a carbon black pigment and
   (ii) five chromatic colour inkjet inks including:
   (a) a first inkjet ink WR having a hue angle H* between 10° and 40° and a chroma C* between 30 and 80;
   (b) a second inkjet ink WY having a hue angle H* between 65° and 85° and a chroma C* between 30 and 80;
   (c) a third inkjet ink Y having a hue angle H* between 85° and 105° and a chroma C* larger than 80;
   (d) a fourth inkjet ink C having a hue angle H* between 180° and 240° and a chroma C* between 30 and 80; and
   (e) a fifth inkjet ink M having a hue angle H* between 300° and 360° and a chroma C* between 30 and 80,
   wherein the hue angle H* and the chroma C* are calculated from CIE L*a*b* coordinates determined on a polyethylene coated white paper for a 2° observer under a D50 light source,
   wherein the chromatic colour inkjet inks having a hue angle H* between 180° and 360° have a ratio T/P of thioxanthone compound to pigment complying with the relationship:

$$0.0 \leq T/P \leq 0.2, \text{ and}$$

wherein T represents the wt. % of thioxanthone compound and P represents the wt. % of pigment, both wt. % based on the total weight of the inkjet ink.

2. The UV curable inkjet ink set of claim 1, wherein the pigment concentration in inkjet inks WR and WY is each less than 1.5 wt. % based on the total weight of the inkjet ink and the pigment concentration in inkjet inks Y, C and M is each more than 1.5 wt. % based on the total weight of the inkjet ink.

3. The UV curable inkjet ink set of claim 1, wherein the inkjet ink WR includes a mixture of a red pigment and an orange pigment and the inkjet ink WY includes a mixture of a yellow pigment and an orange pigment.

4. The UV curable inkjet ink set of claim 1, wherein the inkjet ink C contains a beta-copper phthalocyanine pigment and the inkjet ink M contains a pigment selected from the group consisting of quinacridone, diketopyrrolopyrrole and mixed crystals thereof.

5. The UV curable inkjet ink set of claim 1, wherein the inkjet ink Y contains a pigment selected from C.I. Pigment Yellow 74 C.I. Pigment Yellow 83, C.I. Pigment Yellow 97, C.I. Pigment Yellow 110, C.I. Pigment Yellow 120, C.I. Pigment Yellow 138, C.I. Pigment Yellow 150, C.I. Pigment Yellow 151, C.I. Pigment Yellow 154, C.I. Pigment Yellow 155, C.I. Pigment Yellow 175, C.I. Pigment Yellow 180, C.I. Pigment Yellow 181, C.I. Pigment Yellow 194, C.I. Pigment Yellow 213, C.I. Pigment Yellow 214 and mixed crystals thereof.

6. The UV curable inkjet ink set of claim 5, wherein the black inkjet ink further contains one or more colour pigments having an absorption maximum between 500 and 700 nm.

7. The UV curable inkjet ink set of claim 1, wherein the chromatic colour inkjet inks having hue angles outside the range of 85° to 105° contain 0 to 2 wt. % of a thioxanthone compound based on the total weight of the inkjet ink.

8. The UV curable inkjet ink set of claim 1, wherein the inkjet inks contain an acylphosphineoxide photoinitiator in an amount between 6 and 15 wt. % based on the total weight of the inkjet ink.

9. The UV curable inkjet ink set of claim 1, including as a further achromatic colour inkjet ink a white inkjet ink and/or a colourless inkjet ink.

10. The UV curable inkjet ink set of claim 1, wherein the UV curable inkjet inks contain a polyfunctional acrylate monomer or oligomer in an amount of more than 50 wt. % based on the total weight of the inkjet ink.

11. A decorative panel including an inkjet printed colour pattern printed with four inkjet inks as defined in claim 1.

12. An inkjet printing method including the steps of
   a) jetting a colour pattern with inkjet inks from a UV curable inkjet ink set as claimed in claim 1 on a substrate and
   b) UV curing the inkjet inks on the substrate using UV LEDs having an emission wavelength between 360 nm and 405 nm.

13. The inkjet printing method of claim 12, wherein the substrate is selected from the group consisting of polyvinylchloride (PVC), acrylonitrile butadiene styrene (ABS) and polypropylene (PP).

14. A method of manufacturing a decorative panel including the inkjet printing method according to claim 13.

15. The method of manufacturing a decorative panel of claim 14, further including a step c) by inkjet printing a UV curable varnish onto the colour pattern.

16. A method of manufacturing a decorative panel including the inkjet printing method according to claim 12.

17. The method of manufacturing a decorative panel of claim 16, further including a step c) by inkjet printing a UV curable varnish onto the colour pattern.

\* \* \* \* \*